United States Patent [19]
Kim

[11] Patent Number: 5,627,605
[45] Date of Patent: May 6, 1997

[54] METHOD FOR CORRECTING DIGITAL CONVERGENCE OF MULTI-MODE PROJECTION TELEVISION

[75] Inventor: Jae J. Kim, Seoul, Rep. of Korea

[73] Assignee: Goldstar Co., Ltd., Seoul, Rep. of Korea

[21] Appl. No.: 399,604

[22] Filed: Mar. 7, 1995

[30] Foreign Application Priority Data

Mar. 7, 1994 [KR] Rep. of Korea ..................... 4398/1994

[51] Int. Cl.$^6$ ..................................................... H04N 9/28
[52] U.S. Cl. ...................... 348/745; 315/368.12; 348/807
[58] Field of Search .................................. 348/177, 180, 348/184, 189, 190, 745, 807; 315/368.12; H04N 9/28

[56] References Cited

U.S. PATENT DOCUMENTS

| | | | |
|---|---|---|---|
| 4,672,275 | 6/1987 | Ando | 358/60 |
| 4,673,847 | 6/1987 | Louie et al. | 358/65 |
| 4,816,908 | 3/1989 | Coleneau et al. | 358/60 |
| 5,216,497 | 6/1993 | Tsujihara et al. | 358/60 |
| 5,272,421 | 12/1993 | Kimura et al. | 348/807 |
| 5,345,280 | 9/1994 | Kimura et al. | 348/746 |

*Primary Examiner*—Victor R. Kostak
*Attorney, Agent, or Firm*—Fish & Richardson P.C.

[57] ABSTRACT

A method for correcting digital convergence performed with respect to four modes of NTSC, ED, MUSE and ZENITH only by adjusting the convergence for a single mode on a software basis includes the steps of adjusting a specific mode and calculating correction data based on adjustment data for the specific mode and storing adjustment data and correction data in memory, and calculating correction data of other modes based on correction data stored for the specific mode, thereby remarkably improving the accuracy of the convergence, facilitating adjustment time and adjustment itself, simplifying the system to cut down the price of the system while enabling digital convergence of a multi-sync projection television to apply it to household use and monitors for personnel computers and video conferencing.

17 Claims, 13 Drawing Sheets adjusting point data
$(0, D_0), (h, D_h), (2h, D_{2h}), (3h, D_{3h}), (4h, D_{4h})$

| | | NTSC | ED | MUSE | ZENITH |
|---|---|---|---|---|---|
| relative raster position | A | 1 | 2 | 2 | 3 |
| | B | 15 | 30 | 32 | 45 |
| | C | 31 | 62 | 66 | 93 |
| | D | 63 | 126 | 135 | 189 |
| | E | 95 | 190 | 203 | 285 |
| | F | 127 | 254 | 272 | 381 |
| | G | 159 | 318 | 340 | 477 |
| | H | 191 | 382 | 409 | 573 |
| | I | 223 | 446 | 478 | 667 |
| | J | 239 | 478 | 512 | 717 |
| | K | 255 | 510 | 546 | 765 |
| horizontal frequency(HP) | | 15.75KHz | 31.5KHz | 33.75KHz | 47.25KHz |
| number of scanning lines | | 262.5 | 525 | 562.5 | 787.5 |

<TABLE 1>

| |
|---|
| A=sf/2⁵×3×7²×11×h⁴(16,−49,66,−49,16) · 1D |
| B=sf/2⁵×3×7²×11×h³(−336,1176,−1848,1568,−560) · 1D |
| C=sf/2⁵×3×7²×11×h²(2096,−7889,15114,−16121,6800) · 1D |
| D=sf/2⁵×3×7²×11×h(−3696,14406,−30492,52822,−33040) · 1D |
| E=sf(0,0,0,0,1) · 1D |

<TABLE 2>

| i | | | s |
|---|---|---|---|
| 0 | Y(s)=d₀Y(s)=d₀Y(s−1)+d₁Y(s−1) | Y(0)=d₀Y(0)=E | S≥0 |
| 1 | d₁Y(s−1)=d₁Y(s−2)+d₂Y(s−2) | d₁Y(0)=A+B+C+D | S≥1 |
| 2 | d₂Y(s−2)=d₂Y(s−3)+d₃Y(s−3) | d₂Y(0)=14A+6B+2C | S≥2 |
| 3 | d₃Y(s−3)=d₃Y(s−4)+d₄Y(s−4) | d₃Y(0)=36A+6B | S≥3 |
| 4 | d₄Y(s−4)=24A | d₄Y(0)=24A | S≥4 |

METHOD FOR CORRECTING DIGITAL CONVERGENCE OF MULTI-MODE PROJECTION TELEVISION

BACKGROUND OF THE INVENTION

1. Field of the Invention

The present invention relates to a method for correcting digital convergence, and more particularly to a digital convergence correcting method for correcting digital convergence with respect to four modes of NTSC, ED, MUSE and ZENITH only by adjusting convergence for a single mode on a software basis.

2. Description of the Prior Art

FIG. 1 is a construction view showing a conventional analog convergence correcting apparatus.

As illustrated in FIG. 1, the analog convergence correcting apparatus includes a timing controller 1 for generating a clock and a control signal required for the system by using horizontal and vertical blanking signals HBLK and VBLK synchronized with deflection as inputs, and a basic correcting waveform generator 2 for generating a waveform required for correcting convergence by using a signal from the timing controller 1. In addition to these, a first convergence corrector 3 forms a waveform required for adjusting a center and a periphery of a picture by means of a signal from the basic correcting waveform generator 2, a second convergence corrector 4 forms a waveform required for precisely adjusting the periphery of the picture by means of a signal from the basic correcting waveform generator 2, and an amplifier 5 amplifies to supply a corrected waveform from the first and second convergence correctors 3 and 4 to horizontal and vertical convergence yokes 7 through which correction current flows.

The operation of the analog convergence correcting apparatus constructed as above will be described with reference to FIGS. 2 and 3.

FIG. 2 is a crosshatch pattern for point control, and FIGS. 3A and 3B are adjustment waveforms with respect to a point six of FIG. 2.

The convergence correction is carried out by two steps of overall picture adjustment and point adjustment. The overall picture adjustment is executed in such a manner that the waveform from the basic correcting waveform generator 2 is utilized for controlling the size and polarity thereof by the first convergence corrector 3 to adjust the size, linearity, pin-cushion and key-stone with respect to overall picture. In connection with the point adjustment, the waveform from the basic correcting waveform generator 2 is utilized to be modified in the first convergence corrector 3, thereby generating various waveforms having the maximum sizes at respective points of FIG. 2 and adjusting the size and polarity of the waveforms.

For example, the basic correcting waveform as shown in FIG. 3B generated from the basic correcting waveform generator 2 is modified to have the maximum size at the point six of FIG. 2 for obtaining the waveform as shown in FIG. 3A, and the polarity and size of the obtained waveform is adjusted by an electrical variable register to allow for the point adjustment with respect to the point six of FIG. 2.

Also, the adjustment waveforms for other points of FIG. 2 can be produced by generating a waveform having the maximum size at each point.

The above-mentioned conventional analog convergence correcting system must use data corresponding to each mode by adjusting respective modes to deal with multi-mode.

Consequently, because of difficulty in processing various modes via a digital system, a conventional convergence correcting apparatus of a multi-mode projection television has been embodied in the analog system. When compared with the digital system, the analog system has drawbacks of low accuracy in adjustment, long and laborious adjustment time, unsuitable automatic adjustment in case of using a sensor, and complicated and expensive system.

FIG. 4 is a construction view showing a conventional digital convergence correcting apparatus.

As shown in FIG. 4, the digital convergence correcting apparatus includes a phase locked loop (PLL) 11 for producing a reference clock required for the system by using horizontal and vertical blanking signals HBLK and VBLK synchronized with deflection, a microcomputer 12 for calculating adjusting point data to obtain data required for the correction, and a nonvolatile EEPROM 13 for storing adjustment data of the adjusting point under the control of the microcomputer 12. Under the control of the microcomputer 12, a SRAM 15 stores correction data corresponding to the picture one by one, and a gate array 14 reads out to supply the correction data from the SRAM 15. Furthermore, a digital-to-analog (D/A) converter 16 converts digital data from the gate array 14 to an analog signal, a low-pass filter (LPF) 17 filters the correction data from the D/A converter 16, and an amplifier 18 amplifies the signals to supply a correction waveform from the LPF 17 to horizontal and vertical convergence yokes HCY and VCY.

The operation of the digital convergence correcting apparatus constructed as above will be described with reference to FIGS. 5 and 6.

FIG. 5 is a crosshatch pattern for point control, and FIG. 6 is a view for illustrating a calculating method of the correction data of FIG. 4 in the vertical direction.

The microcomputer 12 calculates the data needed for correcting convergence of a picture from the adjusting point data read out from the EEPROM 13 to store the obtained result in the SRAM 15, and the PLL 11 produces the reference clock required in the gate array 14 to read out the stored correction data by being synchronized with the horizontal and vertical blanking signals HBLK and VBLK. The gate array 14 separates the correction data read out from the SRAM 15 into each color in accordance with the reference clock from the PLL 11, and the D/A converter 16 converts to supply the separated signal into the analog signal.

The analog data from the D/A converter 16 is filtered in the LPF 17, and is amplified in the amplifier 18 for the purpose of driving the convergence yokes HCY and VCY to thereby be supplied to them.

By this operation, the convergence correction with the screen is accomplished.

In order to accomplish the adjustment in this way, there are seven adjusting points in the horizontal direction and five in the vertical direction in view of the crosshatch pattern for point control as shown in FIG. 5. Here, the inner portion of a rectangle 19 is a controlling pattern actually displayed on a screen; and that of a rectangle 20 is for describing a method for calculating the correction data from the five major adjusting points in the vertical direction, which is illustrated in FIG. 6 in detail.

Referring to FIG. 6, fourth-order polynomial interpolation obtained by five adjusting point data is written as equations 1 and 2, provided that h-numbered scanning lines exist between the adjusting points in the vertical line 20, and adjustment data of respective adjusting points are denoted by $D_0$, $D_h$, $D_{2h}$, $D_3$, and $D_{4h}$.

$$y(s) = \sum_{i=0}^{4} Li(s) \cdot Di \qquad \text{equation (1)}$$

$$Li(s) = \sum_{j=0, j \neq i}^{4} \frac{(s-jh)}{(ih-jh)} \qquad \text{equation (2)}$$

where "s" is 4h from zero, and Li(s) is a Lagrangian coefficient which is calculated in advance using equation (2) and stored in a program area of the microcomputer to be used during the calculation.

In the above-stated calculating method according to equations (1) and (2), the value Li(s) differs for each mode during a multi-sync input, which is too bulky to be stored in the program area of the microcomputer.

Therefore, the aforesaid conventional digital convergence correcting system has a disadvantage of difficulty in embodying a multi-mode digital convergence correcting apparatus.

SUMMARY OF THE INVENTION

The present invention is devised to solve the above-described problems. Accordingly, it is an object of the present invention to provide a method for correcting digital convergence, in which digital convergence correction is performed with respect to four modes only by adjusting convergence for a single mode on a software basis for heightening accuracy of the adjustment, shortening adjusting time, being suitable for automatic adjustment by means of a sensor and simplifying a system thereof.

To achieve the above object of the present invention, there is provided a method for correcting digital convergence which is carried out by the steps of adjusting a specific mode among multiple modes and calculating correction data based on adjustment data from adjusting the specific mode, storing the correction data in memory, and calculating correction data for other modes based on the correction data stored for the specific mode.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
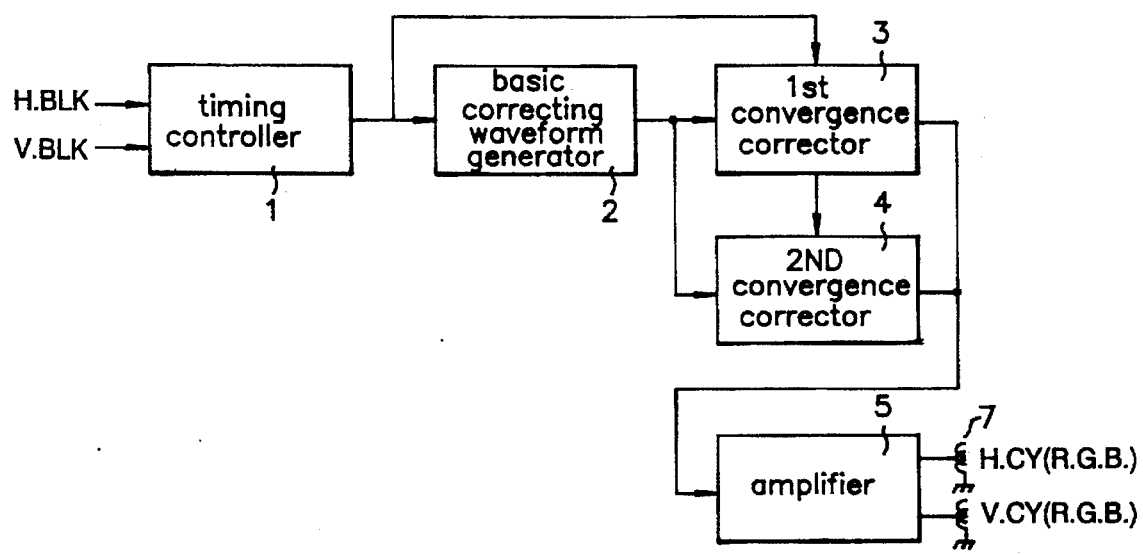
FIG. 1 is a construction view showing a conventional analog convergence correcting apparatus.
Figure 2:
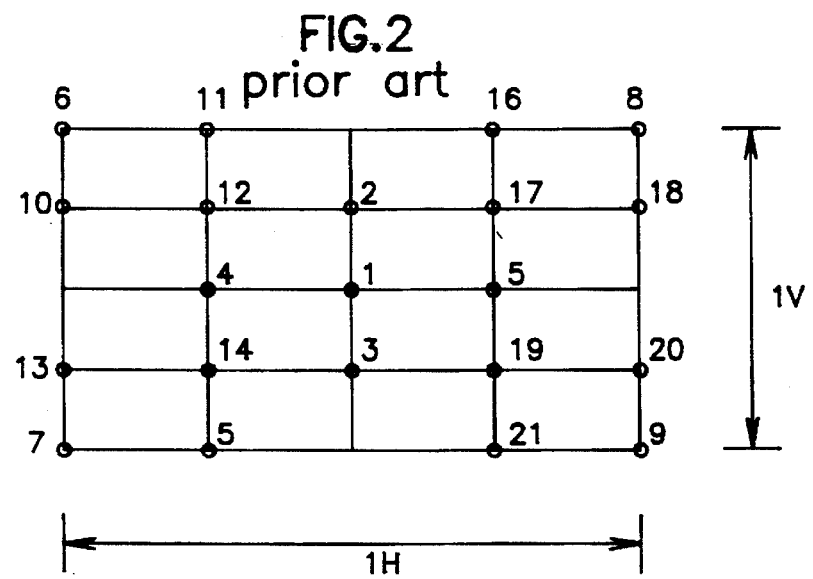
FIG. 2 shows a crosshatch pattern for point control of FIG. 1.
Figure 3A:
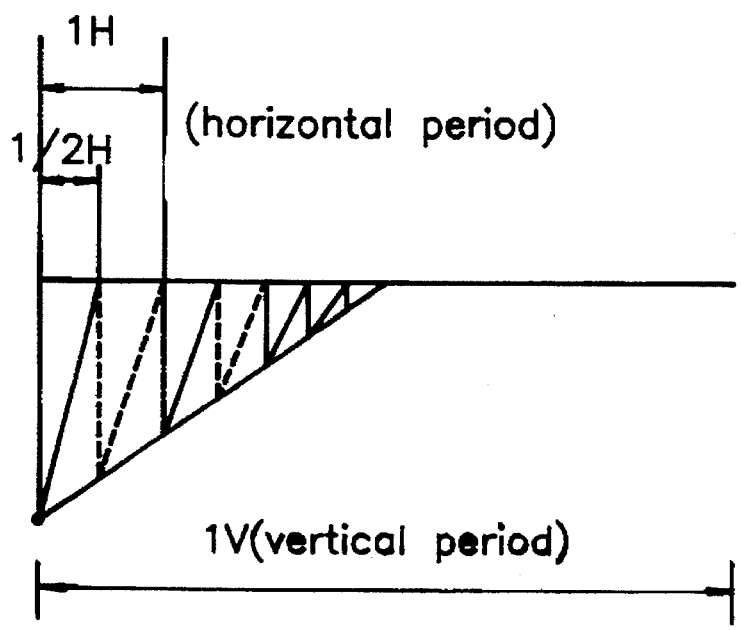
FIGS. 3A and 3B are adjustment waveforms of a point six in FIG. 2.
Figure 3B:
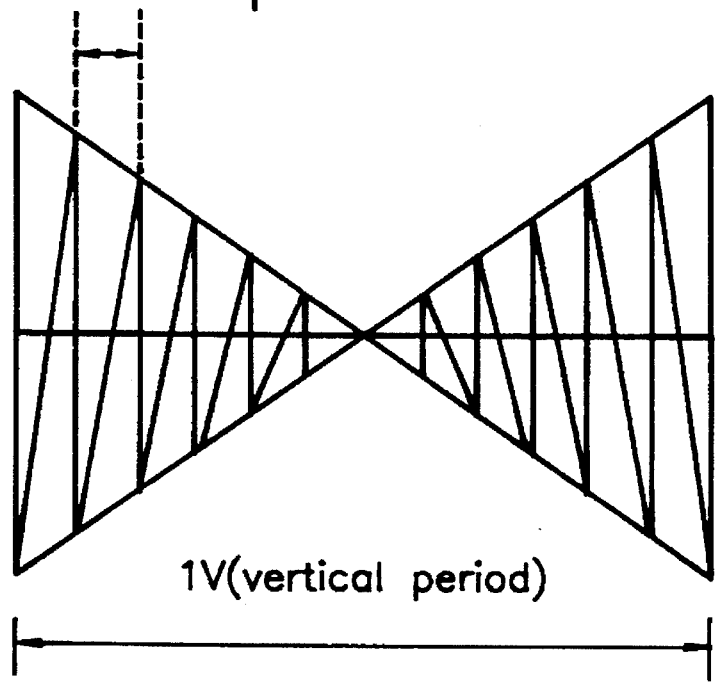
Figure 4:
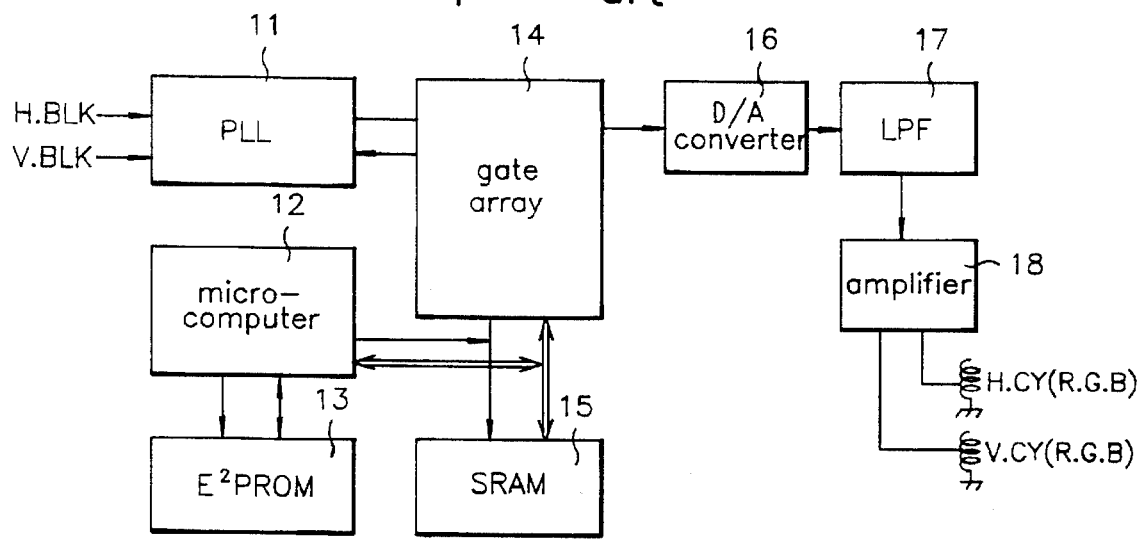
FIG. 4 is a construction view showing a conventional digital convergence correcting apparatus.
Figure 5:
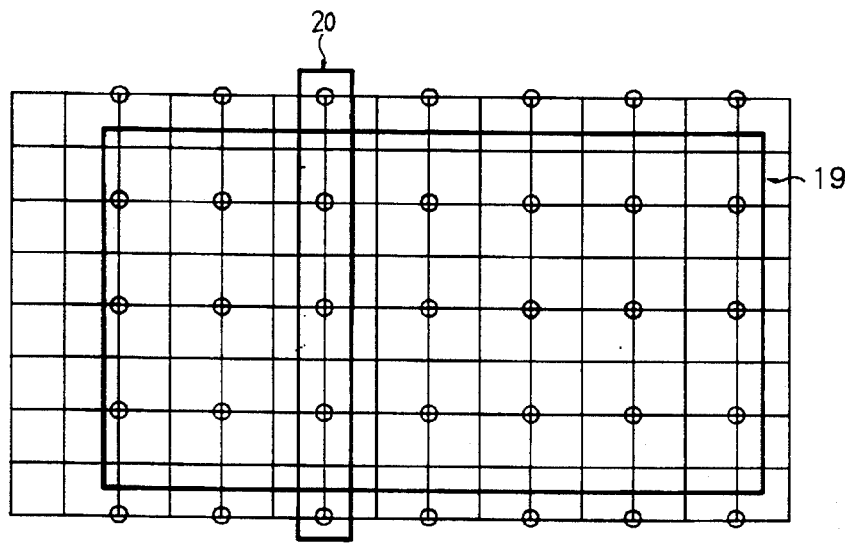
FIG. 5 shows a crosshatch pattern for point control of FIG. 4.
Figure 6:
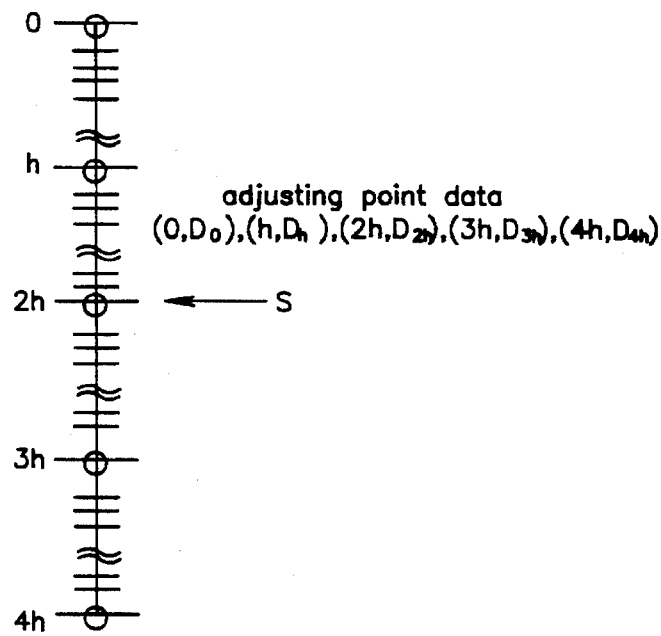
FIG. 6 is a view for illustrating a method for calculating correction data of FIG. 4 in the vertical direction.
Figure 7:
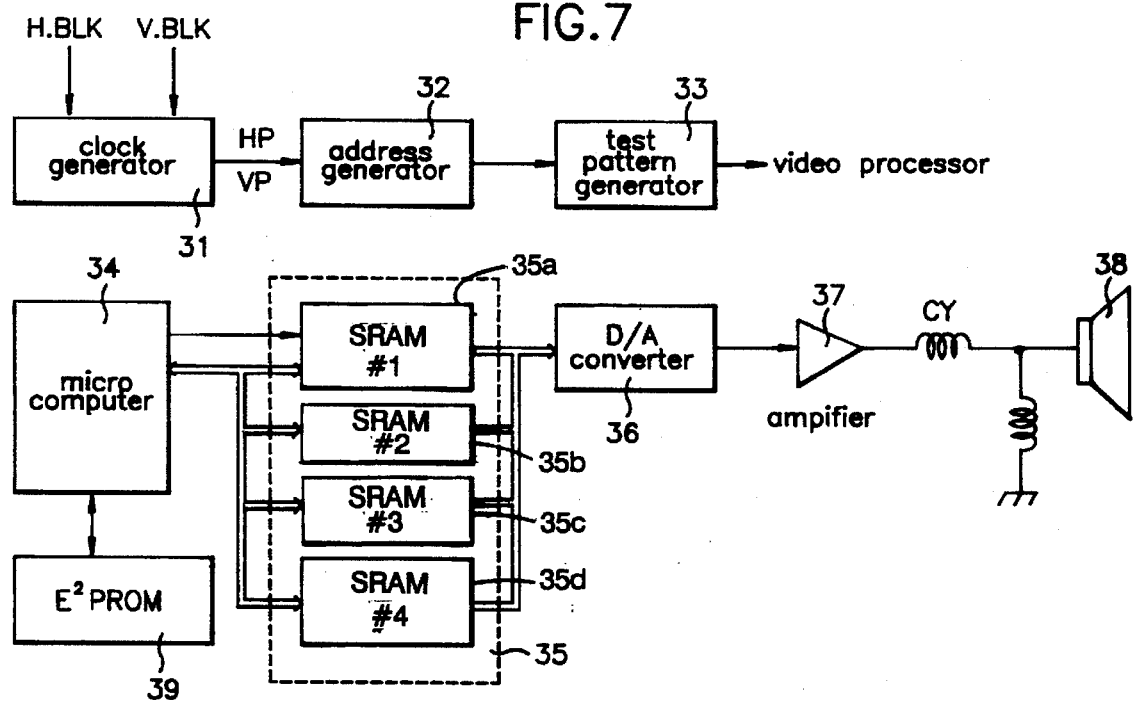
FIG. 7 is a construction view showing a digital convergence correction system to which the present invention is applied.

Referring to FIG. 7, a digital convergence correction system to which the present invention is applied includes a clock generator 31, an address generator 32, a test pattern generator 33, a microcomputer 34, a memory 35, a D/A converter 36, an amplifier 37, a cathode ray tube (CRT) 38, a yoke coil CY and an EEPROM 39.

The clock generator 31 receives horizontal and vertical blanking signals HBLK and VBLK synchronized with deflection as inputs to be oscillated by a voltage control, thereby generating a reference clock required for the system and dividing the reference clock to produce horizontal and vertical pulses HP and VP.

The address generator 32 generates an address by using the horizontal and vertical pulses HP and VP from the clock generator 31.

The test pattern generator 33 utilizes an output of the address generator 32 to form a test pattern.

The microcomputer 34 uses data stored in the EEPROM 39 to calculate correction data of respective modes.

The memory 35 consisting of a plurality of SRAMs 35a, 35b, 35c and 35d is cleared under the control of the microcomputer 34 to store the correction data of respective modes.

The D/A converter 36 converts data stored in the SRAMs 35a, 35b, 35c and 35d of the memory 35 prior to being supplied thereto into analog data.

The amplifier 37 amplifies an output of the D/A converter 36.

The yoke coil CY controls the current flow through the CRT 38 in accordance with the output of the amplifier 37.

The EEPROM 39 stores to supply adjustment data of adjusting points to the microcomputer 34.

Hereinafter, an operation of the digital convergence correction system constructed as above to which the present invention is applied will be described.

Upon turning on a power, the microcomputer 34 reads out the adjustment data from the EEPROM 39 for calculating the correction data needed for the correction to store the result in corresponding SRAMs 35a, 35b, 35c and 35d.

Once the horizontal and vertical blanking signals HBLK and VBLK are received after a deflection portion is stabilized, the clock generator 31 generates the horizontal and vertical pulses HP and VP. Successive to this operation, the address generator 32 generates the address.

In accordance with the address from the address generator 32, corresponding SRAM 35a, 35b, 35c or 35d supplies the stored correction data which is converted into the analog signal in the D/A converter 36 to thus be amplified in the amplifier 37. A correction waveform from the amplifier 37 flows along the yoke coil CY to accomplish the convergence correction.

When a multi-mode signal is received, the microcomputer 34 detects the horizontal and vertical blanking signals HBLK and VBLK to determine the current mode, and the address generator 32 generates the address to allow for access to the correction data with respect to the current mode from the memory 35 while the memory 35 supplies the correction data corresponding to the current mode under the control of the microcomputer 34.

Figure 8:
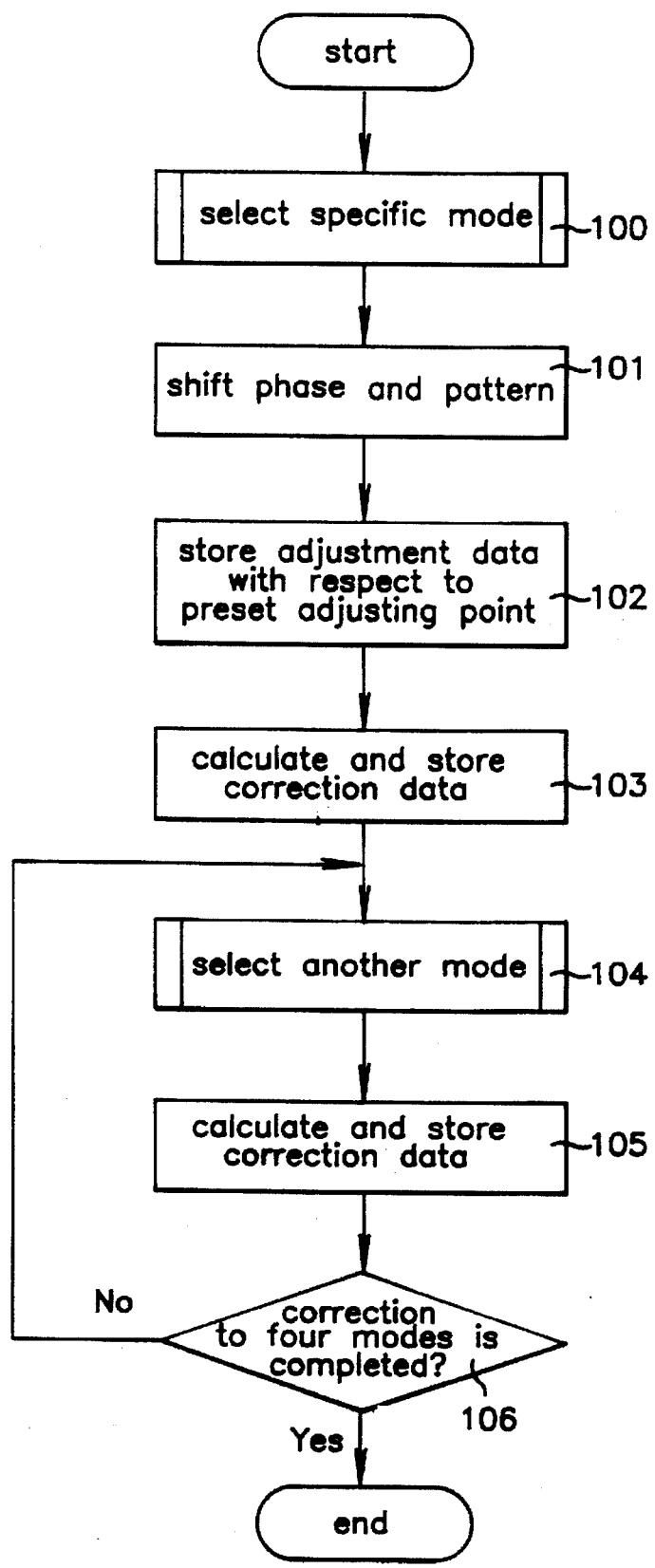
FIG. 8 is an overall flowchart of a method for correcting digital convergence of multi-mode according to the present invention.
Figures 9, 10:
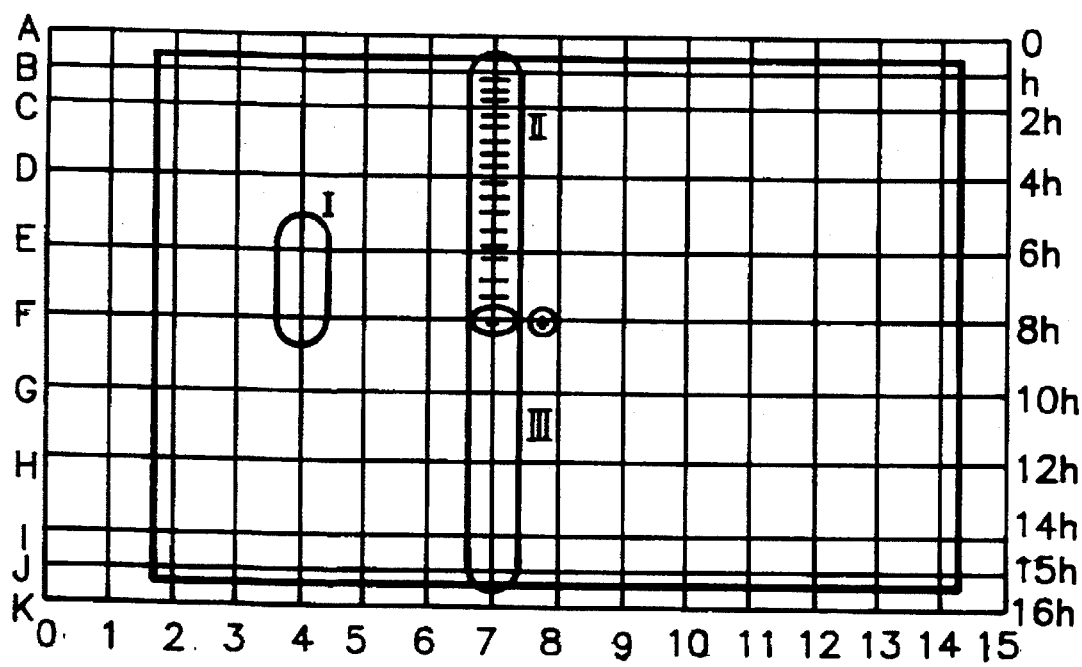
FIG. 9 is a table for illustrating raster values for respective modes.
FIG. 10 represents an illustration of a controlling picture under adjustment.
Figure 11:
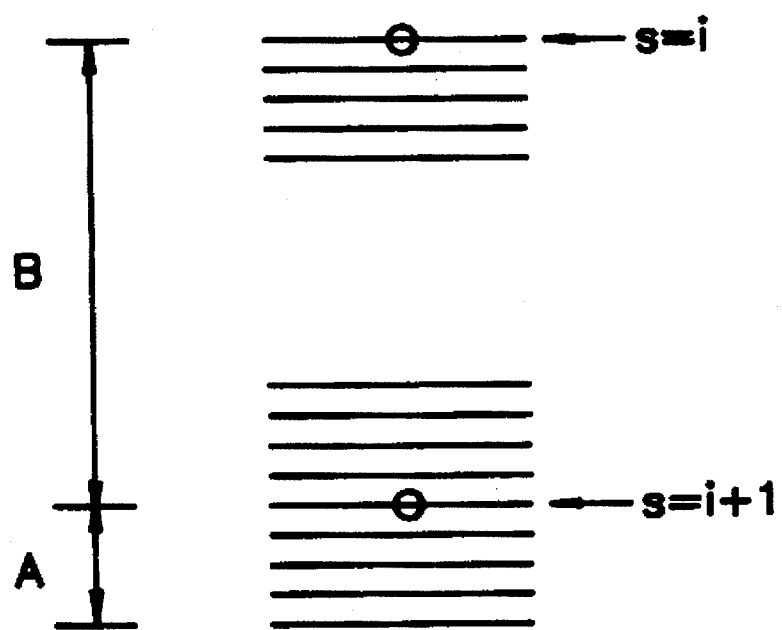
FIG. 11 is a view for illustrating a first-order linear interpolation by divided difference and step-by-step series.
Figure 12:
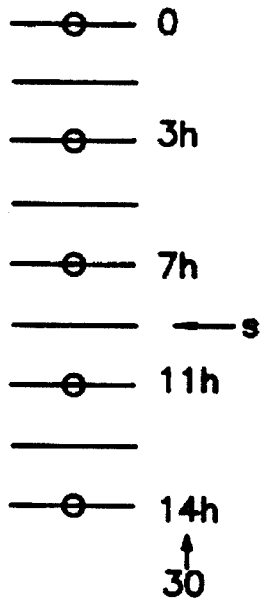
FIG. 12 is a view for illustrating a fourth-order polynomial interpolation by divided difference and step-by-step series.

FIG. 8 is an overall flowchart of a method for correcting digital convergence of multi-mode according to the present invention, FIG. 9 is a table for illustrating raster values for respective modes, FIG. 10 represents an illustration of a controlling picture under adjustment, FIG. 11 is a view for illustrating a first-order linear interpolation, and FIG. 12 is a view for illustrating a fourth-order polynomial interpolation.

Now, the method for correcting the digital convergence of the multi-mode will be described below.

To begin with, specific mode adjusting and correction data calculating steps 100, 101, 102 and 103 are performed for calculating to store the adjustment data and correction data of respective adjusting points set on the controlling picture of a test pattern in a specific mode.

More specifically, after selecting the specific mode (step 100), the phase and pattern shifting step 101 is carried out for shifting the phase and pattern on the controlling picture. Then, an adjustment data storing step 102 is executed for storing the adjustment data of the preset adjusting points, and an adjusting step is performed for calculating and storing adjustment data via the first linear interpolation with respect to a crosspoint of an adjusted section by means of the stored adjustment data. Thereafter, a correction data calculating step 103 is carried out for calculating and storing the correction data by using the stored adjustment data.

Here, a crosspoint of vertical and horizontal scanning lines in the outermost area of the controlling picture within the test pattern, and a crosspoint of vertical and horizontal scanning lines corresponding to every second point along the vertical and horizontal directions are set as respective adjusting points. Moreover, respective adjusting points may be set by all crosspoints. Therefore, the total number of the adjusting points are 35 resulting from seven adjusting points in the horizontal direction and five in the vertical direction.

When an arbitrary mode among NTSC, ED, MUSE and ZENITH having the raster positions as shown in FIG. 9 is selected to be adjusted (step 100), the phase and pattern are shifted since the delay within the system differs due to different horizontal frequency per mode (step 101).

The adjusting test pattern as shown in FIG. 10 displayed on the screen at this time consists of 16 vertical lines and 11 horizontal lines. Thus, a crosspoint corresponding to every second point is set as the adjusting point, the inside the thick solid-lined portion is the controlling picture actually presented on the screen, and a portion designated by a symbol ⊕ becomes the center of the picture. For these reasons, the phase and pattern shift is executed for allowing the pictorial center of the pattern to be concurrent with the mechanical center of the screen.

The illustration for presenting the raster position as shown in FIG. 9 is for representing the position of the adjusting point by the raster number per mode, in which points A and K are excluded out of the adjusting points, but the adjusting points are moved near to the actual picture to be placed on points B and J, respectively.

After finishing the phase and pattern adjustment, the adjusting points set among the crosspoints from B to J, i.e., the adjustment data numbering 35 in total resulting from seven adjusting points in the horizontal direction and five in the vertical direction, are obtained in the test pattern of the controlling picture as shown in FIG. 10 are obtained by means of the raster values with respect to the scanning lines of FIG. 9, and the obtained adjustment data are stored in the EEPROM 39.

The adjustment data stored in the EEPROM 39 are utilized in calculating the correction data with respect to the adjusted section, and the calculated correction data are stored in the SRAMs 35a, 35b, 35c and 35d, respectively.

The correction data calculating step described above is attained by calculating and storing the correction data via the fourth-order polynomial interpolation with respect to the inside the controlling picture by means of the adjustment data of the calculated crosspoint and stored adjusting point, and by calculating and storing the correction data via the first-order linear interpolation with respect to the outside the controlling picture by means of the adjustment data of the calculated crosspoint and stored adjusting point.

In more detail, the adjustment against the adjusting point is performed to obtain the adjustment data with respect to the crosspoints of all vertical lines and horizontal lines on the picture. At this time, the correction data is obtained by the first-order linear interpolation to be stored in the memory 35.

Upon the completion of storing the adjustment data for all crosspoints of the controlling picture, the adjustment data of the adjusting point is utilized to effect the fourth-order polynomial interpolation with respect to the inside the controlling picture, so that the correction data is calculated to be stored. Also, the first-order linear interpolation is effected with respect to the outside the controlling picture to calculate and store the correction data.

After completing the specific mode adjustment and correction data calculation, steps 104, 105 and 106 of calculating correction data of other modes are performed, in which the adjustment data stored in another mode is used to calculate and store the adjustment data and correction data.

In other words, one step is to calculate and store the correction data via the fourth-order polynomial interposition with respect to the inside the controlling picture by using the adjustment data of the calculated crosspoint and of stored adjusting point, and the other step is to calculate and store the correction data via the first-order linear interpolation with respect to the outside the controlling picture by using the adjustment data of the calculated crosspoint and of stored adjusting point.

Here, the first-order linear interpolation and fourth-order polynomial interpolation are performed by the calculation via divided difference and step-by-step series, or by the calculation via Lagrange's formula.

Referring to FIG. 11, the first-order linear interpolation via the divided difference and step-by-step series will be described in detail.

In FIG. 11, a section B represents an interpolation area, a section A is an extrapolation area.

The first-order linear interpolating equation is defined as below, assuming that the adjustment data of two adjusting points are denoted by $D_i$ and $D_{i+h}$ at scanning lines that s=1 and s=1+h:

$$y(s) = \frac{D_{i+h} - D_i}{(i+h) - i} (s - i) + D_i \quad \text{equation (3)}$$

where, for the purpose of shortening time for calculating y(s), y(s) may be represented by y(s−1) and a divided difference value thereof. That is to say, $$y(s) = y(s-1) + \frac{D_{i+h} - D_i}{h}, \quad y(i) = D_i \quad \text{equation (4)}$$

In equation (4), since $$\frac{D_{i+h} - D_i}{h}$$

is a constant value after performing the adjustment, y(s) can be simply obtained by the addition of y(s−1) and $$\frac{D_{i+h} - D_i}{h}.$$

Referring to FIG. 12, the fourth-order polynomial interpolation by the divided difference and step-by-step series will be described below.

FIG. 12 illustrates portions II and III of FIG. 10, in which a relative distance with respect to the adjusting point at the uppermost portion is designated by 30 to easily derive the equation.

If five adjusting point data are denoted by $D_0$, $D_{3h}$, $D_{7h}$, $D_{11h}$ and $D_{14h}$, the correction data y(s) at an arbitrary scanning line "s" can be written by the relation:

$$y(s) = a \cdot s \cdot (s-3h) \cdot (s-7h) \cdot (s-11h) + b \cdot s \cdot (s-3h) \cdot (s-7h) + c \cdot s \cdot (s-3h) + d \cdot s + e$$
(where s equals zero to 14h), in which $a = 1/(2^5 \times 3 \times 7^2 \times 11 \times h^4) \, (16, -47, 66, -47, 16) \circ D$ $b = 1/(2^5 \times 3 \times 7^2 \times 11 \times h^3) \, (0, 21, -66, 72, -32) \circ D$ $c = 1/(3 \times 4 \times 7 \times h^2) \, (0, 0, 3, -7, 4) \circ D$ $d = 1/3h \, (0, 0, 0, 1, -1) \circ D$ and $e = (0, 0, 0, 0, 1) \circ D$ \quad equation (5)

where the symbol ∘ denotes a dot product, and D is D14h, D11h, D7h, D3h and D0.

When y(s) of equation (5) is developed, and it is defined that Y(s)=sf·y(s) (where sf is a constant):

$$Y(s) = As^4 + Bs^3 + Cs^2 + Ds + E \quad \text{equation (6)}$$

(provided that A=sf×a, B=sf×(−21ab+b), C=sf×(131ah²−10bh+c), D=sf×(−231ah³+21bh²−3ch+d), and E=sf×e.)

The values A, B, C, D and E of the above equation (6) are presented as shown in <Table 1> and are constants, but too much time is taken in calculating Y(s) by the microcomputer, so that a divided difference equation is derived to Y(s) until a constant term is secured via the method as equation (4) in order to embody it only by addition in place of multiplication for facilitating the calculation.

When it is defined that $d_i \, Y(s-1) = d_i \, Y(s-i-1) + d_{i+1} \, Y(s-i-1)$ (where i=0,1,2,3), and $d_0 Y(s) \triangleq Y(s)$, the result is as shown in <Table 2>.

Figure 13:
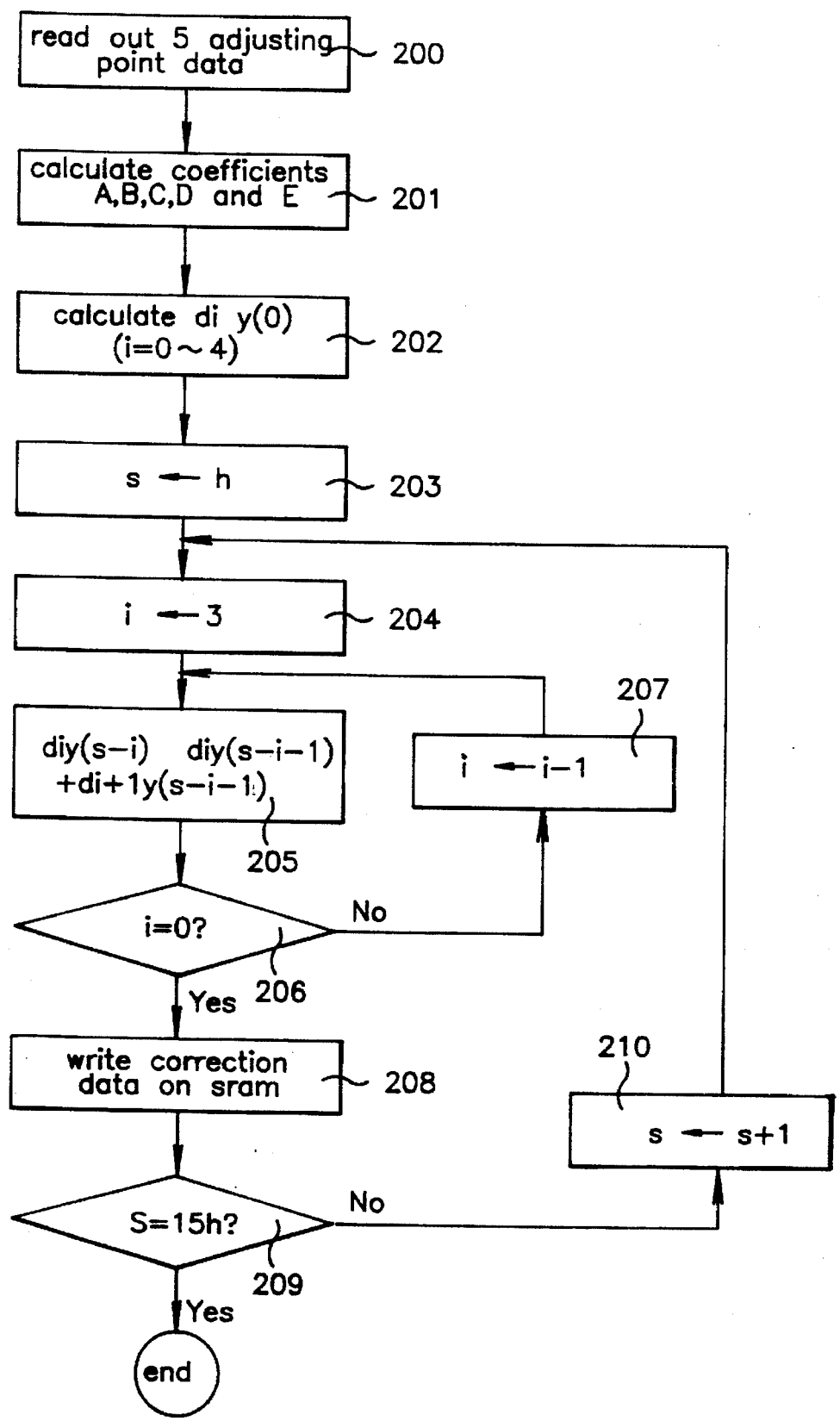
FIG. 13 is a flowchart showing the fourth-order polynomial interpolation by the divided difference and step-by-step series.

Referring to FIG. 13, the sequence of calculating y(s) subjected to the fourth-order polynomial interpolation will be described.

First, the adjustment data of five adjusting points are read out (step 200), the coefficients A, B, C, D and E are determined via equations (5) and (6) (step 201), and then an initial value by <Table 2> is calculated (step 202).

After calculating the initial value, the correction data is obtained in the order that $d_4Y \rightarrow d_3Y \rightarrow d_2Y \rightarrow d_1Y \rightarrow d_0Y(s) = Y(s)$ (steps 203, 204, 205, 206 and 207), and the obtained correction data is stored in the SRAMs (step 208). By repeating the addition that $d_i \, Y(s-1) \leftarrow d_i \, Y(s-i-1) + d_{i+1} \, Y(s-i-1)$ and writing of the correction data on the SRAM until "s" reaches 15h from h, the fourth-order polynomial interpolation can be performed at high speed (steps 208, 209 and 210).

Referring to FIG. 10, the method for calculating overall correction data will be briefly described.

A section that "s" is 15h to 16h or zero to h corresponds to the section A of FIG. 11 to thus obtain the extrapolation correction data by the first-order linear interpolation. With respect to the section that "s" is h to 15h, the correction data is obtained by fourth-order polynomial interpolation.

Here, it will be described that the above-stated first- and fourth-order polynomial interpolations by means of the divided difference and step-by-step series are carried out via Lagrange's formula.

Figure 14:
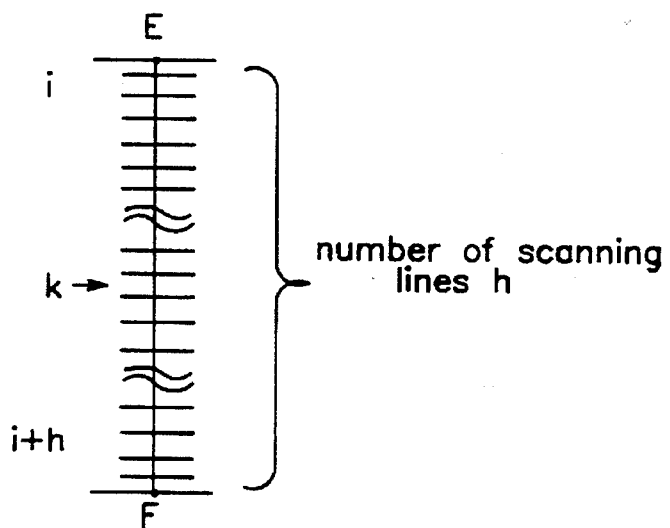
FIG. 14 is a view for illustrating the first-order linear interpolation by Lagrange's formula.

Referring to FIG. 14, the first-order linear interpolation via the Lagrange's formula will be described in detail.

FIG. 14 is a view enlarging the portion I of FIG. 10, in which a crosspoint E is placed at a scanning line i, an adjusting point F is placed at a scanning line i+h, and a reference symbol h denotes the number of the scanning lines.

At this time, if it is defined that the adjustment data at the crosspoint E and adjusting point F are designated by e and f, correction data D(k) at an arbitrary scanning line K is specified by Lagrange polynomial as below:

$$D(k) = L_{10}(k)e + L_{11}(k)f \text{ (where } i \leq k \leq i+h) \quad \text{equation (7)}$$

Here, $$L_{10}(k) = (k-1)/((i+h)-i), \, L_{11}(k) = (k-(i+h))/(i-(i+h)) \quad \text{equation (8)}$$

Therefore, the correction data D(k) at the scanning line K is simply obtained by $L_{10}(k)$ $L_{11}(k)$ unrelated to the adjusting data e and f, and adjusting data e and f in equation (7).

Also, $L_{10}(k)$ $L_{11}(k)$ are functions of the number of scanning lines h between the scanning line K and adjusting point, which can be obtained in advance with respect to the section A-K.

The first-order linear interpolation as above will be described in detail with reference to FIGS. 15 and 16.

Figure 15:
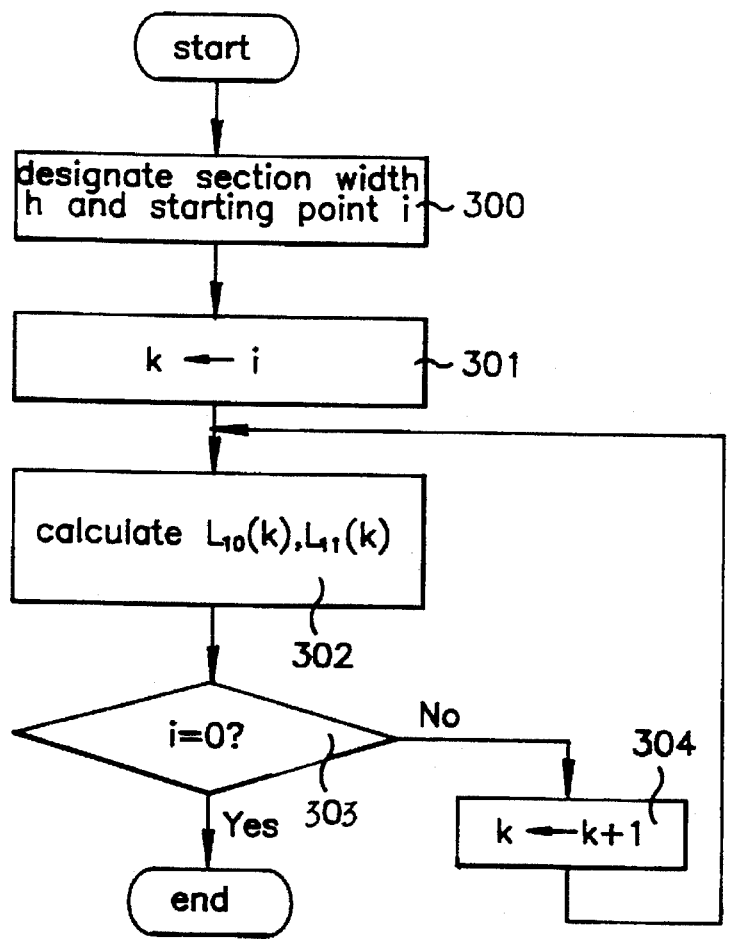
FIG. 15 is a flowchart showing a method for generating the first Lagrangian coefficient.
Figure 16:
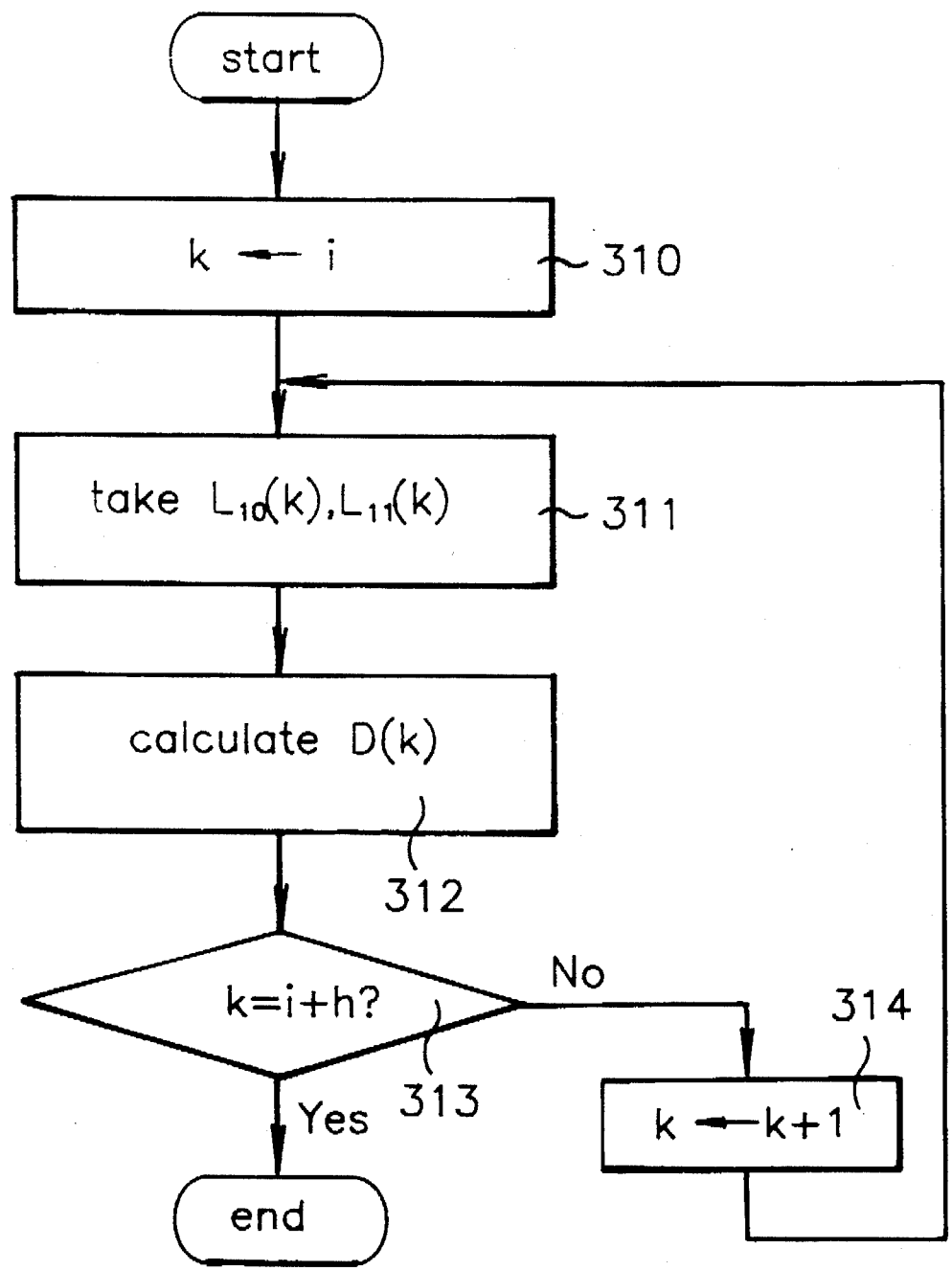
FIG. 16 is a flowchart showing a correction data calculating method by the first-order linear interpolation of the Lagrange's formula.

FIG. 15 is a flowchart showing a method for generating the first Lagrangian coefficient, and FIG. 16 is a flowchart showing a correction data calculating method by the first-order linear interpolation of the Lagrange's formula.

The values $L_{10}(k)$ and $L_{11}(k)$ are calculated in advance complied with the method for generating first Lagrangian coefficient to coincide with respective mode and section width h prior to performing the first-order linear interpolation via equation (7).

More specifically, as shown in FIG. 15, the section width h is set in accordance with the number of scanning lines, and a value of a starting point i is designated (step 300), and the starting point of the calculation is set to the point i (step 301). Then, the values $L_{10}(k)$ and $L_{11}(k)$ are calculated (step 302) according to equation (8) while incrementing the calculating site k (step 304) until it reaches the site i+h (step 303).

The first Lagrangian coefficient generated as above is utilized for calculating the correction data.

In other words, as shown in FIG. 16, the starting point of the calculation is set to i (step 310), the calculated $L_{10}(k)$ and $L_{11}(k)$ are taken (step 311), and the correction data D(k) is calculated (step 312) according to equation (7) while incrementing the calculating site k (step 314) until it reaches the site i+h (step 313).

Upon the completion of the adjustment by calculating the adjustment data, a post-interpolation of adjustment is performed. The post-interpolation method is performed such that the above-stated first-order linear interpolation is executed with respect to the outside the controlling picture, and, with respect to the inside the controlling picture, the fourth-order polynomial interpolation is executed to respective two portions II and III partitioned in FIG. 10. The post-interpolation method will be described with reference to FIGS. 10 and 17.

Figure 17:
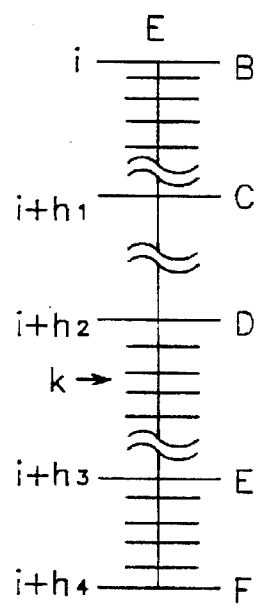
FIG. 17 is a view for illustrating the fourth-order polynomial interpolation by the Lagrange's formula.

FIG. 17 is a view enlarging the portion II of FIG. 10, in which the correction data D(k) for an arbitrary scanning line K is written as follows, provided that the positions of the scanning lines at B, C, D, E and F are respectively i, i+h1, i+h2, i+h3 and i+h4, and the adjusting point data are b, c, d, e and f.

$$D(k)=L_{40}(k)b+L_{41}(k)c+L_{42}(k)d+L_{43}(k)e+L_{44}(k)f \quad \text{equation (9)}$$

Here, reference numerals h1, h2, h3 and h4 are functions for corresponding mode and adjusted section.

As can be noted in equation (9), the correction data with respect to the arbitrary scanning line K can be obtained by using five 4th-order Lagrange polynomial unrelated to the adjustment data and the adjustment data.

Also, $L_{40}(k)$, $L_{41}(k)$, $L_{42}(k)$, $K_{43}(k)$ and $L_{44}(k)$ which are functions for the arbitrary scanning line K and each mode can be obtained in advance, and respective equations for the values are as follows.

$$L_{40}(k) = \frac{(k-(i+h1))(k-(i+h2))(k-(i+h3))(k-(i+h4))}{(i-(i+h1))(i-(i+h2))(i-(i+h3))(i-(i+h4))} \quad \text{equation (10)}$$

$$L_{41}(k) = \frac{(k-i)(k-(i+h2))(k-(i+h3))(k-(i+h4))}{((i+h1)-i)((i+h1)-(i+h2))((i+h1)-(i+h3))((i+h1)-(i+h4))}$$

$$L_{42}(k) = \frac{(k-i)(k-(i+h1))(k-(i+h3))(k-(i+h4))}{((i+h2)-i)((i+h2)-(i+h1))((i+h2)-(i+h3))((i+h2)-(i+h4))}$$

$$L_{43}(k) = \frac{(k-i)(k-(i+h1))(k-(i+h2))(k-(i+h4))}{((i+h3)-i)((i+h3)-(i+h1))((i+h3)-(i+h2))((i+h3)-(i+h4))}$$

where h1 denotes the number of scanning lines in a section B–C, h2 is that in a section B–D, h3 is that in a section B–E, and h4 is that in a section B–F.

Consequently, the Lagrangian coefficients for the first-order interpolation and fourth-order polynomial interpolation with respect to four modes of NTSC, ED, MUSE and ZENITH are obtained in advance to be stored in the program area of the microcomputer.

The fourth-order polynomial interpolation method will be described in detail with reference to FIGS. 18 and 19.

Figure 18:
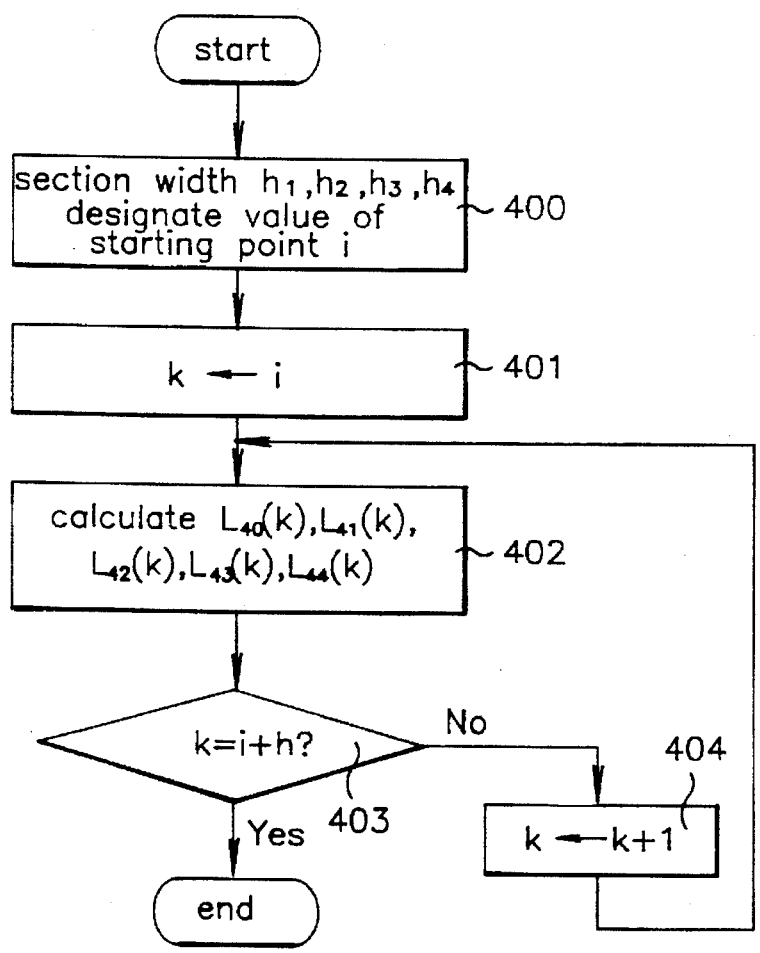
FIG. 18 is a flowchart showing a method for generating the fourth Lagrangian coefficient.
Figure 19:
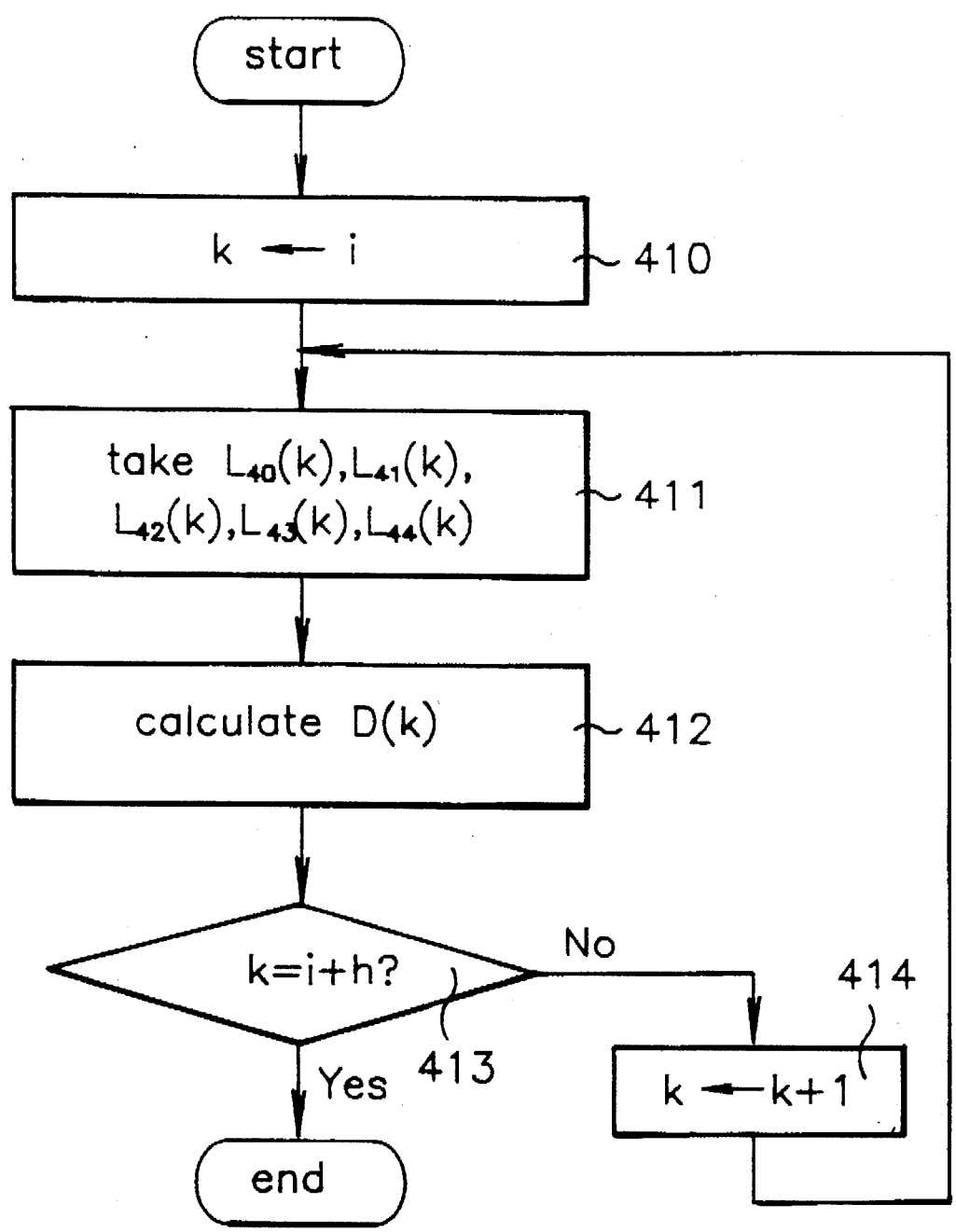
FIG. 19 is a flowchart showing a correction data calculating method by the fourth-order polynomial interpolation method of the Lagrange's formula.

FIG. 18 is a flowchart showing a method for generating the fourth Lagrangian coefficient, and FIG. 19 is a flowchart showing a correction data calculating method by the fourth-order polynomial interpolation of the Lagrange's formula.

As shown in FIGS. 18 and 19, the fourth-order polynomial interpolation is carried out similarly to the first-order linear interpolation.

The values $L_{40}(k)$, $L_{41}(k)$, $L_{42}(k)$, $L_{43}(k)$, and $L_{44}(k)$ which are the fourth Lagrangian coefficients are formerly calculated in accordance with the method for generating the fourth Lagrangian coefficient to be congruous to respective modes and section width h, and the fourth-order polynomial interpolation is carried out via equation (9).

That is, as shown in FIG. 18, the section widths h1, h2, h3 and h4 are set according to the number of scanning lines, a value of a starting point i is designated (step 400), and the starting position of the calculation is set to i (step 401). Thereafter, the values $L_{40}(k)$, $L_{41}(k)$, $L_{42}(k)$, $L_{43}(k)$, and $L_{44}(k)$ are calculated via equation (10) (step 402) while incrementing the calculating site k one by one (step 404) until it reaches i+h4 (step 403).

The fourth Lagrangian coefficients generated as above is utilized to calculate the correction data.

As shown in FIG. 19, the starting point of the calculation is set to i (step 410), the calculated values $L_{40}(k)$, $L_{41}(k)$, $L_{42}(k)$, $L_{43}(k)$, and $L_{44}(k)$ are taken (step 411) to calculate the correction data D(k) via equation (9) (step 412) while incrementing the calculating site k one by one (step 414) until it reaches i+h4 (step 413).

As described above, the adjustment data of the adjusting point is obtained by means of the phase and pattern control with respect to the specific mode, which is, in turn, identically applied to four modes, thereby enforcing the digital convergence of the multi-mode.

As another embodiment of the present invention, a correction method is performed with respect to an arbitrary horizontal frequency.

A horizontal frequency is measured by the microcomputer, and proper Lagrangian coefficients are calculated by using the relation between an adjusting point site and the horizontal frequency in NTSC mode. Thus, The value of correction data can be calculated by using the obtained values and adjusting point data.

At this time, the phase and pattern shifting values are determined by a linear estimation from a mode (e.g., MUSE) having the horizontal frequency of 33.75 KHz and a mode (e.g., ZENITH) having the horizontal frequency of 47.25 KHz, in case of a mode having the horizontal frequency of 39.2 KHz.

Here, when the horizontal phase value in the MUSE mode is a, and that in the ZENITH mode is b, the horizontal phase value can be obtained from the following equation.

$$\text{Horizontal Phase at 39.2 KHz} = \frac{(b-a)}{(47.252)-(33.75)} \times 39.2 + a \quad \text{equation (11)}$$

Therefore, by means of equation (11), proper phase and pattern shifting data for the arbitrary mode, i.e., the mode between 15.75 Khz and 47.25 KHz, can be obtained.

As a result, since only a single mode is adjusted with respect to four modes, and the method for calculating correction data which is heretofore impossible to be carried out with respect to multi-sync input is devised, a method for correcting digital convergence of multi-mode according to the present invention has following effects.

First, the accuracy of convergence is remarkably improved.

Second, the adjusting time and facilitation of the adjustment are significantly favorable.

Third, the overall system is simplified to cut down the price of the system.

Fourth, by allowing for the digital convergence in a multi-sync projection television, the projection television can be applied to monitors for personnel computer and conference monitor as well as to the typical household use.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method for correcting digital convergence in multi-mode projection television comprising the steps of:

selecting a specific mode with respective adjusting points set on a controlling picture of a test pattern;

calculating adjustment data including the steps of setting scanning lines corresponding to the specific mode selected by use of a microcomputer and storing the adjustment data for adjusting points set by shifting the phase and adjustment pattern;

obtaining an adjustment data vector from the stored adjustment data and obtaining in advance for a selected mode respective coefficient values and initial values for respective finite differential equations by means of interpolation from the adjustment data vector; and obtaining and storing correction data in a mode other than said selected mode, wherein said other mode is calculated by interpolating with the coefficient and initial values using the finite differential equations.

2. A method for correcting digital convergence of a multi-mode projection television as claimed in claim 1, wherein said respective adjusting points are set by crosspoints of vertical and horizontal scanning lines in the outermost area of said controlling picture within said test pattern and by crosspoints of vertical and horizontal scanning lines corresponding to every two points in the vertical and horizontal directions.

3. A method for correcting digital convergence of a multi-mode projection television as claimed in claim 2, wherein said adjusting points number 35 in total by seven in the horizontal direction and five in the vertical direction.

4. A method for correcting digital convergence of a multi-mode projection television as claimed in claim 2, wherein said step of adjusting said specific mode and calculating said correction data comprises:

a phase and pattern shifting step for shifting phase and pattern on said controlling picture by selecting said specific mode;

an adjustment data storing step for storing adjustment data of respective adjusting points set as above;

an adjustment data calculating step for calculating and storing said adjustment data by performing first-order linear interpolation with respect to the crosspoint within an adjusted section by means of said stored adjustment data; and a correction data calculating step for calculating and storing said correction data by means of said stored adjustment data.

5. A method for correcting digital convergence of a multi-mode projection television as claimed in claim 4, wherein said correction data calculating step is carried out by:

calculating to store said correction data via fourth-order polynomial interpolation with respect to inside said controlling picture by means of said adjustment data; and calculating to store said correction data via first-order linear interpolation with respect to outside said controlling picture by means of said adjustment data.

6. A method for correcting digital convergence of a multi-mode projection television as claimed in claim 4, wherein said first-order linear interpolation is executed by the calculation via divided difference and step-by-step series.

7. A method for correcting digital convergence of a multi-mode projection television as claimed in claim 4, wherein said first-order linear interpolation is executed by the calculation via Lagrange's formula.

8. A method for correcting digital convergence of a multi-mode projection television as claimed in claim 5, wherein said first-order linear interpolation is executed by the calculation via divided difference and step-by-step series.

9. A method for correcting digital convergence of a multi-mode projection television as claimed in claim 5, wherein said first-order linear interpolation is executed by the calculation via Lagrange's formula.

10. A method for correcting digital convergence of a multi-mode projection television as claimed in claim 5, wherein said fourth-order polynomial interpolation is executed by the calculation via divided difference and step-by-step series.

11. A method for correcting digital convergence of a multi-mode projection television as claimed in claim 5, wherein said fourth-order polynomial interpolation is executed by the calculation via Lagrange's formula.

12. A method for correcting digital convergence of a multi-mode projection television as claimed in claim 4, wherein said step of calculating correction data of other modes is carried out by:

calculating to store said correction data via fourth-order polynomial interpolation with respect to inside said controlling picture by means of said adjustment data; and calculating to store said correction data via first-order linear interpolation with respect to outside said controlling picture by means of said adjustment data.

13. A method for correcting digital convergence of a multi-mode projection television as claimed in claim 12, wherein said first-order linear interpolation is executed by the calculation via divided difference and step-by-step series.

14. A method for correcting digital convergence of a multi-mode projection television as claimed in claim 12, wherein said first-order linear interpolation is executed by the calculation via Lagrange's formula.

15. A method for correcting digital convergence of a multi-mode projection television as claimed in claim 12, wherein said fourth-order polynomial interpolation is executed by the calculation via divided difference and step-by-step series.

16. A method for correcting digital convergence of a multi-mode projection television as claimed in claim 12, wherein said fourth-order polynomial interpolation is executed by the calculation via Lagrange's formula.

17. A device for correcting digital convergence of multi-mode projection television comprising:

a remote controller for generating pattern changing data in response to convergence correction;

microcomputer means for providing adjustment data from memory and for calculating correction data from the adjustment data upon input of the specific mode after storing the adjustment data from the pattern changing data in memory, obtaining adjustment data vectors from the adjustment data, obtaining in advance by interpolation coefficients and initial values for the specific mode for use in finite differential equations and determining correction data for the specific mode;

correction data storing means for storing the correction data obtained by the microcomputer; and correction data outputting means for outputting the correction data stored in the correction data storing means to correction current convergent means in response to a control signal of the microcomputer.

* * * * *